United States Patent [19]

Mizote

[11] 3,726,159
[45] Apr. 10, 1973

[54] TRANSMISSION SHIFT PATTERN GENERATOR

[75] Inventor: Masanori Mizote, Yokohama, Japan

[73] Assignee: Nissan Motor Company, Limited, Yokohama City, Japan

[22] Filed: Mar. 15, 1971

[21] Appl. No.: 124,146

[30] Foreign Application Priority Data

Mar. 18, 1970  Japan ..............................45/22484

[52] U.S. Cl. ...................................74/866, 74/752 D
[51] Int. Cl. ............................B60k 21/00, F16h 3/74
[58] Field of Search..........................................74/866

[56] References Cited

UNITED STATES PATENTS

| | | | |
|---|---|---|---|
| 2,891,411 | 6/1959 | Sutherland et al.................. | 74/866 X |
| 2,995,949 | 8/1961 | Gelenius et al........................ | 74/866 |
| 3,052,134 | 9/1962 | Worster.................................. | 74/866 |
| 3,122,940 | 3/1964 | Shimwell et al. ....................... | 74/866 |
| 3,439,564 | 4/1969 | Scholl et al............................. | 74/866 |
| 3,448,640 | 6/1969 | Nelson ................................... | 74/866 |

*Primary Examiner*—Arthur T. McKeon
*Attorney*—Robert E. Burns and Emmanuel J. Lobato

[57] ABSTRACT

An electronic control system for shifting an automotive automatic transmission between two adjacent speed ranges. An electronic circuit or shift pattern generator of the control system includes a trigger circuit having two transistors cascaded and a feedback circuit between the input and output of the trigger circuit. Upon reception of voltage signals representative respectively of engine torque, vehicle speed and, if any, a forced downshift of the transmission, the electronic circuit produces a variety of transmission speed changes or shift patterns, the slope and hysteresis of which can be changed by selecting the resistances of the input resistors and/or of the feedback circuit.

6 Claims, 12 Drawing Figures

TRANSMISSION SHIFT PATTERN GENERATOR

This invention relates generally to automatic transmissions of automotive vehicles and more particularly to electronic control system therefor.

Automatic transmissions of automotive vehicles employ hydraulic means to control shifting from one speed ratio to another. In one type of conventional transmissions, several sets of planetary gears are provided in which hydraulically operated speed change elements such as brakes and clutches are utilized to condition each gear set for different drives such as reduced or direct forward drives. It is desirable that the shifts through the transmission follow a definite shift pattern determined by the driver's intentions and the torque characteristics of the particular vehicle engine employed. At the same time, the shift transitions should be carried out smoothly and imperceptibly from one speed ratio to another. In order to accomplish smooth and imperceptible shifts following a predetermined shift pattern, the clutches and brakes are required to be controlled by continuously monitoring vehicle speed and torque characteristics of the engine.

Shift patterns are, as is well known, a locus of shift points illustrated in plots or diagrams of throttle position and vehicle speed as the axes or coordinates. For each shift between two adjacent speed ranges or ratios on such diagrams, there is an upshift and downshift having inbetween a space. With the foregoing in mind, this space or hysteresis is required to have some important characteristics as follows:

1. Since for acceleration of the vehicle it is desired to run with a lower speed ratio, the hysteresis should have an upshift locus positioned at a higher vehicle speed range than the corresponding downshift locus;

2. Since a forced downshift is necessary for abrupt acceleration or the so-called kick-down operation, the hysteresis should be shifted stepwise toward a higher vehicle speed range;

3. Since for the kick-down operation a forced downshift is desired to occur so instantly as to insure the abrupt acceleration, the hysteresis for the particular operation should be smaller than that for any other modes of operation; and 4. Since even during normal cruising operation too frequent shift transitions are also uncomfortable to the driver, the hysteresis for the cruising operation should be sufficiently large or become larger with the increase of the vehicle speed and/or throttle valve position.

This invention contemplates a simplified electronic control system which is effective to determine the shift pattern having the above-mentioned characteristics and to insure the proper operation and shifting of an automotive vehicle transmission between two adjacent speed ratios. More specifically, the electronic control system of the invention employs a tachometer or the like which is driven by the output shaft of the transmission to generate a voltage signal representative of vehicle speed. A potentiometer is provided which is actuated in accordance with the setting of the throttle valve to produce a voltage signal representative of throttle valve position or an effective opening area of the throttle valve. In addition, a switch is provided which is actuated at a preset throttle valve position corresponding to a forced shiftdown operation so as to generate a volage signal representative of the forced shiftdown or kickdown operation. These voltage signals are applied to a trigger circuit connected with suitable relay switches. These relay switches are provided in electro-hydraulic means for changing the speed ratios of the transmission and are effective to actuate the friction elements or clutches and brakes of the transmission for obtaining the desired speed ratio.

The trigger circuit includes as a unit two cascaded transistors acting as a switch and a feedback circuit interconnecting the output and input of the transistors of the unit. The transistors form a Schmidt trigger circuit, of which the input transistor receives the two voltage signals respectively representative of and corresponding to vehicle speed and throttle setting and additionally receives for a forced shiftdown operation a voltage signal representative thereof. The input transistor becomes conductive when the sum level of the applied signals is more than a predetermined triggering value. With the input transistor conducting, the output transistor, which controls the relay switches of the electro-hydraulic means, is cut-off or is rendered nonconducting to produce an output signal applied to the suitable relay switches. If, however, the predetermined value is higher than the sum level of the signals, the input transistor will be cut-off and the output transistor will become conductive and de-energize the relay switches having been energized. This will cause an upshift to the transmission to a higher speed ratio. On the other hand, if the sum level restores the predetermined level, the relay switches will again be energized and the transmission will be downshifted into the initial lower speed ratio. It should be understood that a discrepancy or hysteresis is produced between downshift and upshift points for any two adjacent speed ratios because a portion of the output signal, if any, is fed back to the input transistor.

The shift points can be adjusted by various parameters in the control circuit so that a desired shift pattern is provided to offer the desired operational characteristics to the vehicle and transmission.

These and other features will become apparent from the specification and drawings, in which.

It is intended that the electronic control system of the invention be applicable to a large variety of automatic transmissions, particularly those in which shifting can be carried out by the operation of friction elements or several sets of planetary gearing. However, the specific embodiments described herein are designed to apply to a transmission of the type which is described in detail in the U.S. Pat. to Yoichi Mori et al. No. 3,640,156 entitled "Control System for Automotive Automatic Transmission" and, therefore, the detail description of the same is herein omitted for the sake of simplicity of illustration.

Figure 1:
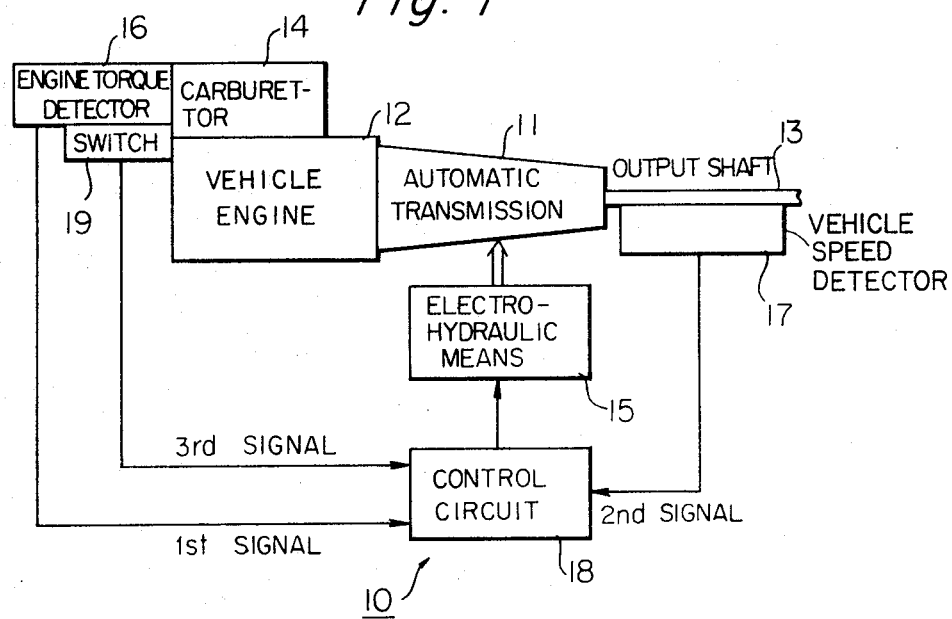
FIG. 1 is a schematic diagram showing an electronic control system of the invention when in use in an automotive vehicle having an automatic transmission.

Referring now to FIG. 1, there is schematically shown an electrical control system 10 according to this invention. The control system 10 is used in combination with a conventional vehicle automatic transmission 11 which may have friction elements or clutches and brakes for obtaining desired change speed ratios. The transmission 11 may also include several sets of planetary gearing each of which is conditioned by the friction elements to provide different drives of reduced or direct speed ratio. Thus, the transmission 11 automatically transmits desired speed-ratio power from a source of motive power or engine 12 through its output shaft 13 to a drive shaft, not shown, of an automotive vehicle, thereby rotatably driving the road wheels of the vehicle. The engine 12 is of internal combustion type and includes a carburetor 14 having a throttle valve, not shown.

There is provided in the control system 10 an electro-hydraulic means 15 for effectively actuating the friction change speed elements in accordance with a desired shift pattern. The electro-hydraulic means 15, for example, may be of the type which is disclosed in U.S. Pat. No. 3,470,854 as mentioned below. In order to determine the desired shift pattern, the control system 10 further includes a first detector 16 for producing a first signal representative of and corresponding to engine torque, a second detector 17 for producing a second signal representative of and corresponding to vehicle speed, and an electric control circuit or shift pattern generator 18 receptive of the first and second signals in parallel for producing an output signal to energize the relay switches of the electro-hydraulic means 15.

The engine torque detector 16 may be of the type which is disclosed in the U.S. Pat. No. 3,470,854 entitled "Fuel Injection System for Internal Combustion Engine" or in U.S. Pat. No. 3,448,640 entitled "Electrical Control for Automatic Transmission", while the vehicle speed detector 17 may be of the type which is disclosed in U.S. Pat. No. 3,433,101 entitled "Electronic Arrangement for Shifting Gears in Motor Vehicles", or in U.S. Pat. No. 3,448,640 as already mentioned. The engine torque detector 16 may include a potentiometer operatively connected to the throttle valve for detecting a throttle position or an effective opening area of the throttle valve. The torque detector 16 may also be of the type operatively connected to a diaphragm valve which has communication with an intake manifold of the engine 12, for detecting a vacuum level in the intake manifold. The vehicle speed detector 17, on the other hand, may preferably include a tachometer mounted on the output shaft 13 for detecting the transmission output speed. It is also preferable that there is provided in the control system 10 a third detector or switch means 19 for producing a third signal representative of and corresponding to a forced shiftdown of the transmission 11. This third signal is supplied to the control circuit 18 in addition to and in parallel with the first and second signals. The kickdown or forced downshift operation may be detected by the switch means 19 at a preset position of the throttle valve or an accelerator pedal, not shown.

Figure 2A:
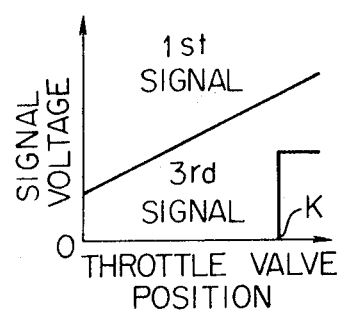
FIG. 2A is a graph illustrating an output signal of a potentiometer or engine torque detector used in the control system of FIG. 1.
Figure 2B:
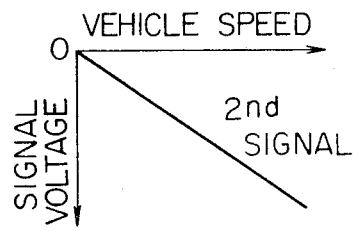
FIG. 2B is another graph similar to FIG. 2A but illustrates an output signal of a tachometer or vehicle speed detector.

The voltage characteristics of these three signals are illustratively shown in FIGS. 2A and 2B. In FIG. 2A, the sloped straight line indicates the first or engine torque signal having a positive voltage the magnitude of which is observed to increase with the increase of an angular position or effective opening area of the throttle valve. The step function of the throttle position, as shown in FIG. 2A, indicates the third or forced shiftdown signal. The point K corresponds to the point at which the throttle valve is opened with an effective opening area of, for example, 90 percent of its maximum value. It is quite natural that this point K can also be dictated by a corresponding position of the accelerator pedal. The sloped straight line in FIG. 2B, on the other hand, indicates the second or vehicle speed signal having a negative voltage the absolute magnitude of which also increases with the increase of the vehicle speed. It is to be understood that these characteristics of the signals are shown solely for illustrative purposes and therefore have modifications determined by the electrical characteristics of the control circuit 18.

Figure 3:
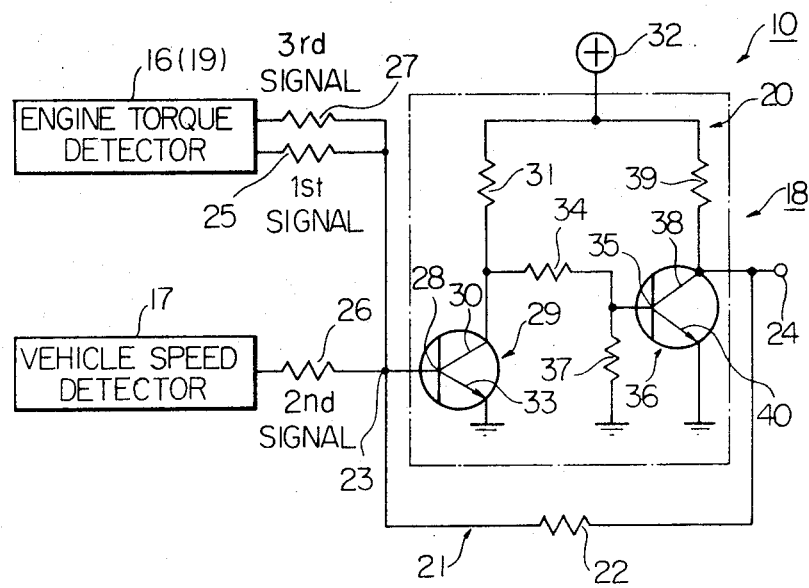
FIG. 3 is an electronic network diagram of the control system of the invention.

Referring now to FIG. 3, there is shown an electrical network diagram of an electrical control system 10 according to this invention. The control system 10 generally comprises the torque detector 16 shown as including a forced shiftdown detector 19, vehicle speed detector 17, and control circuit 18 including a Schmidt trigger circuit 20 for producing an output signal to be applied to the electro-hydraulic means 15 and a feedback circuit 21 and interconnecting through a resistor 22 input and output terminals 23 and 24 of the trigger circuit 20 for feeding back a portion of an output signal, if any, to the input terminal 23.

The first and second signals together with the third signal, if any, are supplied in parallel with each other to the input terminal 23 respectively through input resistors 25, 26 and 27. The input terminal 23 is connected to the base 28 of an input transistor 29 having its collector 30 connected through a resistor 31 to a regulated positive voltage source 32 and its emitter 33 directly grounded. The collector 30 of the transistor 29 is further connected through a resistor 34 to the base 35 of an output transistor 36. The base 35 of the output transistor 36 is grounded through a resistor 37. The voltage source 32 is connected through a resistor 39 to the collector 38 of the output transistor 36, which in turn is directly connected to the output terminal 24. The output transistor 36 has its emitter 40 directly grounded.

Supposing in operation that the effective opening area of the throttle valve is about 50 percent of its maximum valve and that the magnitude of the first signal is sufficiently higher than that of the second signal, then the summed voltage of the two signals to be supplied to the input terminal 23 can be preset to exceed a predetermined triggering value. At this instance, the input transistor 29 will be rendered conductive to permit therethrough a flow of current from the voltage source 32 to the ground. This concurrently leads to reduction of the base potential of the output transistor 36. As a result, the transistor 36 remains nonconductive to develop at the output terminal 24 an output signal having a constant voltage level of the voltage source 32. While the vehicle is running with a lower speed ratio, in this way, there exists an output signal, a portion of which is fed back through the feedback circuit 21 to the input terminal 23.

As the vehicle speed is increased the base potential of the input transistor 29 will be decreased until it is exceeded by the predetermined value. Under this condition, the input transistor 29 becomes less conductive and finally becomes nonconductive. At the same time, the output transistor 36 is rendered conductive by the positive voltage applied from the voltage source 32 to the base 35 thereof. Since no output signal appears at the output terminal 24, in this way, the relay switches in the electro-hydraulic means, which have been energized, are de-energized to establish an upshift of the transmission to a higher speed ratio.

If the sum of the first and second signal exeeds the predetermined triggering value as the vehicle shows down and/or the effective opening area of the throttle valve is increased, on the other hand, the particular relay switches will again be energized so that the transmission will be downshifted into the initial lower speed ratio. In the event a downshift is thus effected, it should be noted that there is no output signal to be fed back to the input terminal 23. More specifically, triggering of the input transistor 29 for downshift is effected at a lower vehicle speed and/or with more effective opening area of the throttle valve than for upshift because of the voltage characteristics of the first and second signals. Therefore, a hysteresis or lag is produced between upshift and downshift patterns for the same vehicle speed or for the same throttle position. This hysteresis is an important feature of this invention and will be discussed in more detail with reference to FIG. 4.

Figure 4:
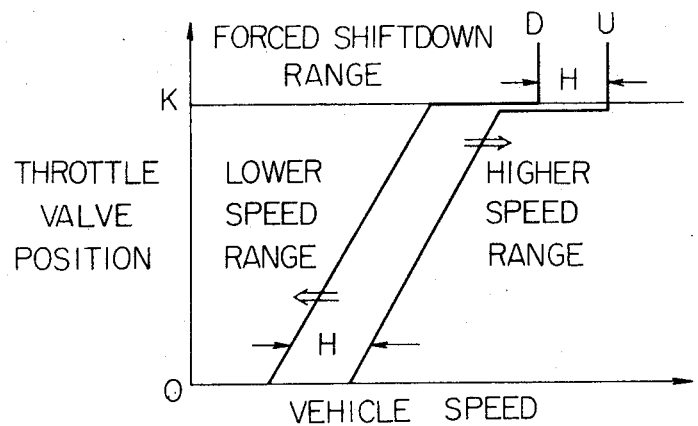
FIG. 4 is a graph illustrating a transmission shift pattern obtained by use of a control system according to FIG. 3.

In FIG. 4, there are shown shift patterns or loci of shift points obtained by the electronic control circuit of FIG. 3 as a function of vehicle speed and throttle position. A pair of sloped straight lines denote the shift patterns corresponding respectively to upshift and downshift between any two adjacent speed ranges or ratios. The right-hand side line U indicates a locus of desired upshift points, and the left-hand side line D denotes a locus of desired downshift points, while the space H between the lines U and D indicates the hysteresis of the control circuit. The width of the hysteresis H is determined by the resistance of the resistor 22 of the feedback circuit 21 in case of an electronic control circuit of FIG. 3. It is desirable that the hysteresis H has a width sufficient for the prevention of oscillation between selected speed ranges. It will thus be seen that each pair of upshift and downshift is effected in accordance with a predetermined relationship between the vehicle speed and throttle position.

In the upper portion of FIG. 4, there is also shown another important feature of the present control circuit. When the effective opening area of the throttle valve is above the point K corresponding to, for example, 90 percent of its maximum value, the third signal corresponding to the forced shiftdown is applied together with the first and second signals to the input terminal 23 of the trigger circuit 20, as shown in FIG. 3. Therefore, the shift patterns for both upshift and downshift are shifted stepwise toward a higher vehicle speed range. This stepwise shifting of the shift pattern is necessary as a forced downshift when it is desirable to be capable of changing from overdrive to direct drive while the particular vehicle is climbing a hill or accelerating to pass another vehicle. In this embodiment, however, the width of the space or hysteresis H is not changeable, because it is determined entirely by the constant resistance of the feedback circuit 21.

It is required that during the forced shiftdown operation a downshift is effected substantially instantly so as to insure an abrupt acceleration. In order to meet this requirement, the hysteresis for the particular operation should be considerably reduced. This is because too frequent shift transitions for normal cruising are uncomfortable to the driver and passengers but instant shift transitions are preferable for such abrupt acceleration.

Figure 5:
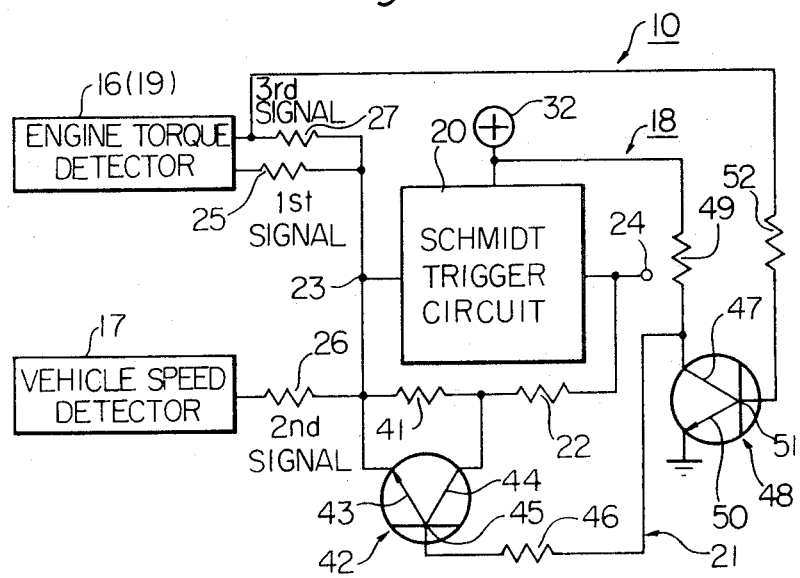
FIG. 5 is a network diagram of another embodiment of a control system according to the invention.
Figure 6:
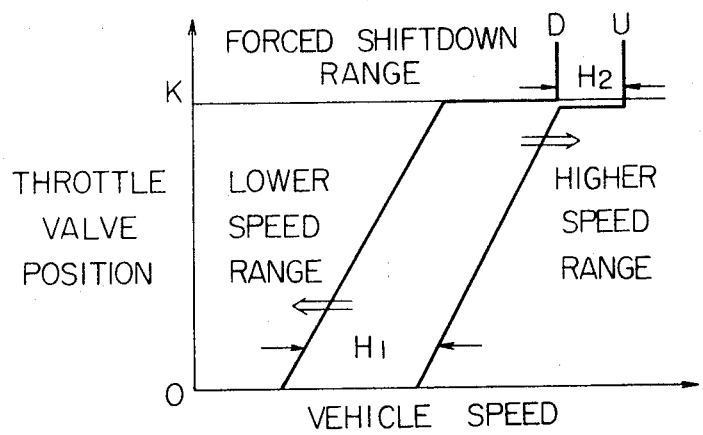
FIG. 6 is a graph of a shift pattern obtained by use of the control system of FIG. 5.

An electrical control system realizing such modified hysteresis is shown in FIGS. 5 and 6, in which corresponding parts and elements are numbered similarly to FIGS. 3 and 4. For simplicity of discussion, the Schmidt trigger circuit 20 will be shown as a whole as a block. In order to reduce the hysteresis for the forced shiftdown operation, there is also provided a series resistor 41 in the feedback circuit 21. A bypass transistor 42 is provided which has its emitter 43 and collector 44 connected in parallel with the series resistor 41. The base 45 of the bypass transistor 42 is connected through a resistor 46 to a collector 47 of a transistor 48 which is further connected through a resistor 49 to the voltage source 32. The transistor 48 has its emitter 50 connected directly to ground and its base 51 connected through a resistor 52 to the switch means 19 which will produce the third signal for the kick-down operation.

Without the third signal produced, the transistor 48 remains nonconductive so that the bypass transistor 42 is, in turn, rendered conductive by the voltage applied from the voltage source 32 to base 45 thereof. While the vehicle is running at a normal cruising speed, therefore, a portion of the output signal having passed the resistor 22 is bypassed through the bypass transistor 42 to the input terminal 23. In this instance, the resistance of the feedback circuit 21 is equal to that of the single resistor 22. As a result, the width of hysteresis $H_1$ is determined solely by the resistance of the resistor 22, which will be understood if reference is made to FIG. 6.

When the third signal is applied to the base 51 of the transistor 48 during a forced downshift, on the other hand, the transistor 48 turns conductive to reduce the base potential of the bypass transistor 42. Thus, the transistor 42 is cut-off or nonconductive to thereby make the resistance of the feedback circuit 21 the sum of the resistors 22 and 41. The increase of the resistance then reduces the width of hysteresis to $H_2$ as shown in FIG. 6. The widths $H_1$ and $H_2$ can be so determined as have any desired values by suitably changing the resistance value of the two resistors 22 and 41.

In the foregoing two examples, the hysteresis width is invariable for all modes of operation with no third signal. It is, however, desired that the hysteresis be increased with the increase of vehicle speed and/or throttle position. This is an important characteristic as far comfortable shift transitions are concerned. For this purpose, the shift pattern for downshift should have a steeper slope than that for upshift in the throttle position and vehicle speed diagram. In other words, the hysteresis between upshift and downshift patterns should vary with the throttle position and/or vehicle speed. This variable hysteresis is accomplished, for example, by varying the resistance of an electrical passage through which the first or second signal is bypassed when supplied to the Schmidt trigger circuit. The method of bypassing the first signal is exemplified in FIG. 7, while the method of bypassing the second signal in FIG. 8.

Figure 7:
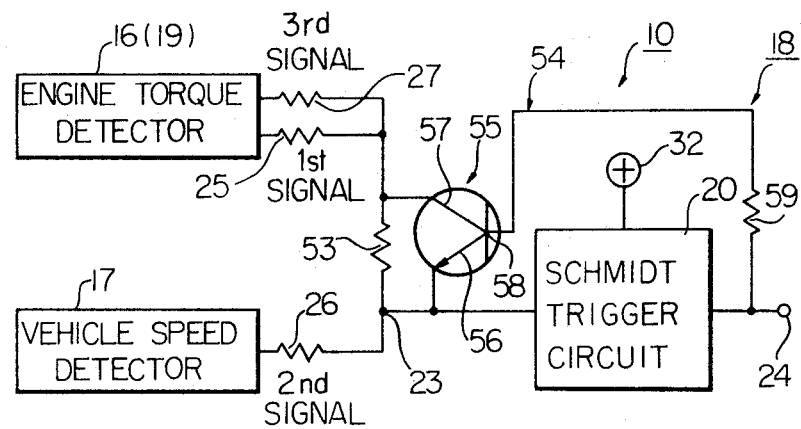
FIG. 7 is a schematic diagram of still another embodiment of a control system according to the invention.

Referring to FIG. 7, there is provided a series resistor 53 between the engine torque detector 16 and the input terminal 23 of the Schmidt trigger circuit 20. There is also provided an electrical connection 54 including a transistor 55 having its emitter 56 and collector 57 connected in parallel to the series resistor 53. The base 58 of the transistor 55 is connected through a resistor 59 to the output terminal 24 of the Schmidt trigger circuit 20.

When, in operation, the vehicle is running at a lower speed range with an output signal appearing at the output terminal 24, a portion of the output signal is applied to the base 58 of the transistor 55 to thereby render it conductive. With the transistor 55 conducting, the first signal having passed through the resistor 25 is bypassed through the particular transistor 55 to the input terminal 23. Thus, the slope of shift pattern obtained for upshift is similar to those of the former examples of FIGS. 3 and 5 if the electrical elements used are similar. When the vehicle is running at a higher speed range, on the contrary, there exists no output signal to be applied to the transistor 55 so that it continues nonconducting. In this instance, the resistance to the first signal passage is the sum of the two resistors 25 and 53. Therefore, the slope of a downshift pattern is steeper than that of an upshift pattern, which can be observed in FIG. 10.

Figure 9A:
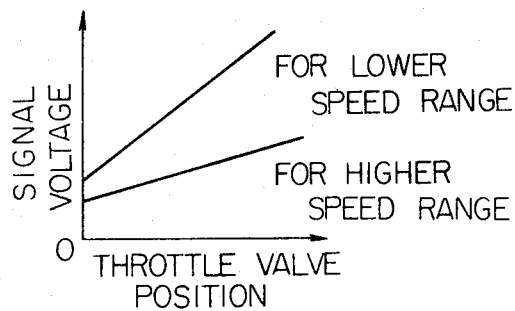
FIG. 9A is a graph illustrating a torque signal explanatory of the operation of the control system of FIG. 7.

This change of passage resistance will be explained with reference to FIG. 9A, in which it is shown to correspond to two different voltage slopes. The upper slope indicates the voltage characteristic of the first signal for a lower speed range where the passage resistance is that of the resistor 25. On the other hand, a lower slope indicates the voltage characteristic for a higher speed range with the summed resistance of the resistors 25 and 53.

Figure 8:
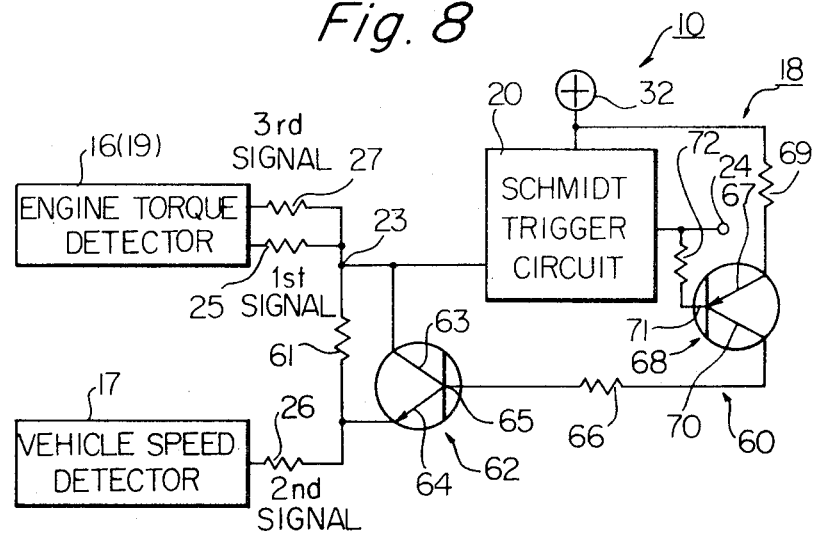
FIG. 8 is a schematic diagram illustrating a modification of the control system of FIG. 7.

In similar example shown in FIG. 8, there is provided an electrical connection 60 through which the second signal is bypassed. The connection 60 will vary the resistance to the second signal passage between the vehicle speed detector 17 and input terminal 23 of the Schmidt trigger circuit 20. In the connection 60 is provided a series resistor 61 to which a bypass transistor 62 is connected in parallel at its emitter 64 and collector 63. The base 65 of the transistor 62 is, in turn, connected through a resistor 66 to a collector 70 of another transistor 68. An emitter 67 of the transistor 68 is connected through a resistor 69 to the voltage source 32. The latter transistor has its base 71 connected through a resistor 72 to the output terminal 24 of the Schmidt trigger circuit 20.

Figure 9B:
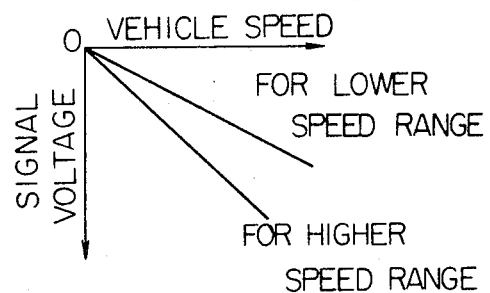
FIG. 9B is a graph illustrating a speed signal explanatory of the operation of the system of FIG. 8.

When the vehicle is running at a lower speed range, the output signal is developed at the output terminal 24 to render the transistor 68 conductive. With the transistor 68 conducting, the bypass transistor 62 becomes conductive and the second signal having passed through the resistor 26 is bypassed through the transistor 62 to the input terminal 23. The resistance of the path between the detector 17 and the input terminal 23 is then the resistor 26. This condition is illustrated in FIG. 9B to correspond to the upper slope for a lower speed range. When the vehicle is running at a higher speed range, on the contrary, the transistor 68, the base of which 71 receives no output signal from the Schmidt circuit 20, remains nonconductive. In this instance, no voltage is applied from the voltage source 32 to the base 65 of the transistor 62. Then, the bypass transistor 62 turns nonconductive so that the resistance of the path between the detector 17 and the input terminal 23 is the sum of the two resistors 26 and 61. This condition is shown in FIG. 9B as a lower slope for the higher speed range.

Figure 10:
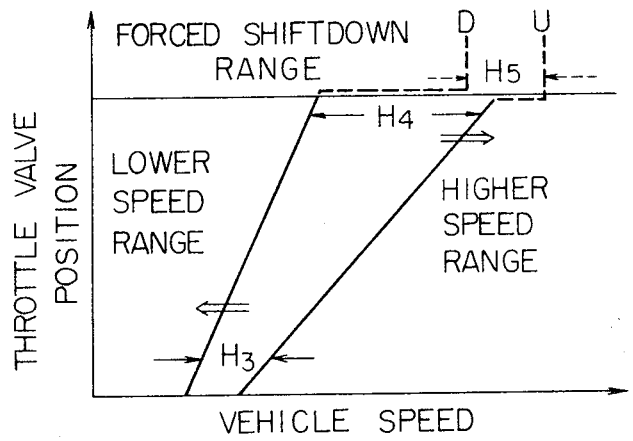
FIG. 10 is a graph of still another shift pattern obtained by use of the control systems of FIGS. 7 and 8.

The shift patterns obtained by the electrical control systems of FIGS. 7 and 8 are shown in FIG. 10, in which the hysteresis is observed to increase from $H_3$ to $H_4$ with the increase of vehicle speed and/or throttle position. In addition, it is preferable that these two control systems are provided with another feedback circuit as of FIG. 3 or 5. For example, the shift patterns of the control systems having such feedback circuit are shown for the forced downshift operation by dotted lines having the width $H_5$ of hysteresis.

In the forgoing examples, explanation has been limited only to shiftings between two adjacent speed ranges. However, the electrical control system of the invention is applicable to an automatic transmission having more than three speed ranges, if additional similar control systems are added between any other two adjacent speed ranges.

It should be appreciated that an important feature of the invention is that the transistors of the Schmidt trigger circuit have their emitters directly grounded with the result that a residual voltage liable to exist at the output terminal can be leaked to ground upon disappearance of the output signal. This is advantageous in that the electrical design of the invention may be varied to accommodate the relay switches or amplifiers which may be provided in the electro-hydraulic means.

Another important feature of the invention is that the slopes of and hysteresis between the upshift and downshift patterns can be simply changed by suitably selecting the resistances of the input resistors and/or of the feedback circuit.

What is claimed is:

1. For use in a vehicle, in combination, a source of motive power and an automatic transmission for coupling the source of motive power to a drive mechanism of a vehicle, and an electronic control system for shifting the transmission between two adjacent speed ranges, said control system comprising: torque-signal producing means detecting the torque of the source of motive power and producing a torque signal comprising a voltage signal representative of the torque of the source of motive power; speed-signal producing means detecting a physical variable varying proportionately as the speed of the vehicle on which said combination is mounted and producing a speed signal comprising a voltage signal representative of the speed of the vehicle; forced shiftdown signal procuding means producing a forced shiftdown signal comprising a voltage signal representative of a forced shiftdown operation of the transmission; actuating means for selectively actuating speed change elements of the transmission when energized; circuit means receptive of said torque, speed and forced shiftdown signals in parallel for energizing said actuating means when the sum of said torque, speed and forced shiftdown signals is above a predetermined triggering level; and means applying said forced shiftdown signal to said circuit means in parallel with said torque and speed signals when a forced shiftdown occurs, said circuit means comprising a trigger circuit having two cascaded transistors, an input connected to said torque signal producing means, speed-signal producing means and forced shiftdown signal producing means and an output applying a trigger signal to said actuating means, and a feedback circuit interconnecting said input and output, said feedback circuit including resistance means, a bypass transistor for bypassing therethrough a portion of voltage signal appearing at said output upon reception of a predetermined level of voltage, and a transistor receptive of said forced shiftdown signal for controlling the reception of said bypass transistor.

2. For use in an automotive vehicle, in combination, a throttle-controlled engine, an automative transmission for coupling the engine to drive mechanism of a vehicle, and an electronic control system for shifting the transmission between two adjacent speed ranges, said control system comprising: first detection means producing a first voltage signal which is a function of throttle valve position; second detection means producing a second voltage signal which is a function of transmission output speed; third detection means producing a third voltage signal which is representative of a forced shiftdown operation of the transmission; electro-hydraulic means for selectively actuating speed change elements of the transmission when energized; circuit means receptive of said first, second and third voltage signals in parallel for energizing said electro-hydraulic means when the sum of said first, second and third voltage signals is above a predetermined triggering level; and means applying said third voltage signal to said circuit means in parallel with said first and second voltage signals when a forced shiftdown occurs, said circuit means comprising a trigger circuit having two cascaded transistors, an input connected to said first, second and third detection means and an output applying a trigger signal to said electro-hydraulic means, and a feedback circuit interconnecting said input and output, said feedback circuit including resistance means, a bypass transistor for bypassing therethrough a portion of a voltage signal appearing at said output upon reception of a predetermined level of voltage, and a transistor receptive of said third voltage signal for controlling the reception of said bypass transistor.

3. For use in a vehicle, in combination, a source of motive power and an automatic transmission for coupling the source of motive power to a drive mechanism of a vehicle, an electronic control system for shifting the transmission between two adjacent speed ranges, said control system comprising: torque-signal producing means detecting the torque of the source of motive power and producing a torque signal comprising a voltage signal representative of the torque of the source of motive power; speed-signal producing means detecting a physical variable varying proportionately as the speed of the vehicle on which said combination is mounted and producing a speed signal comprising a voltage signal representative of the speed of the vehicle; forced shiftdown signal producing means producing a forced shiftdown signal comprising a voltage signal representative of a forced shiftdown operation of the transmission; actuating means for selectively actuating speed change elements of the transmission when energized; circuit means receptive of said torque, speed and forced shiftdown signals in parallel for energizing said actuating means when the sum of said torque, speed and forced shiftdown signals in above a predetermined triggering level; and means applying said forced shiftdown signal to said circuit means in parallel with said torque and speed signals when a forced shiftdown occurs, said circuit comprising a trigger circuit having two cascaded transistors, an input and an output applying a trigger signal to said actuating means, resistance means connected in series with said torque-signal producing means and said input, and a bypass transistor for bypassing therethrough said torque signal upon reception of a voltage signal appearing at said output.

4. For use in an automotive vehicle, in combination, a throttle-controlled engine and an automatic transmission for coupling the engine to drive mechanism of a vehicle, an electronic control system for shifting the transmission between two adjacent speed ranges, said control system comprising: first detection means producing a first voltage signal which is a function of throttle valve position; second detection means producing a second voltage signal which is a function of transmission output speed; third detection means producing a third voltage signal which is representative of a forced shiftdown operation of the transmission; electro-hydraulic means for selectively actuating speed change elements of the transmission when energized; circuit means receptive of said first, second and third voltage signals in parallel for energizing said electro-hydraulic means when the sum of said first, second and third voltage signals is above a predetermined triggering level; and means applying said third voltage signal to said circuit means in parallel with said first and second voltage signals when a forced shiftdown occurs, said circuit means comprising a trigger circuit having two cascaded transistors, an input and an output applying a trigger signal to said electro-hydraulic means, resistance means connected in series with said first detection means and said input, and a bypass transistor for bypassing therethrough said first voltage signal upon reception of a voltage signal appearing at said output.

5. For use in a vehicle, in combination, a source of motive power and an automatic transmission for coupling the source of motive power to a drive mechanism of a vehicle, an electronic control system for shifting the transmission between two adjacent speed ranges, said control system comprising: torque-signal producing means detecting the torque of the source of motive power and producing a torque signal comprising a voltage signal representative of the torque of the source of motive power; speed-signal producing means detecting a physical variable varying proportionately as the speed of the vehicle on which said combination is mounted and producing a speed signal comprising a voltage signal representative of the speed of the vehicle; forced shiftdown signal producing means producing a forced shiftdown signal comprising a voltage signal representative of a forced shiftdown operation of the transmission; actuating means for selectively actuating speed change elements of the transmission when energized; circuit means receptive of said torque, speed and forced shiftdown signals in parallel for energizing said actuating means when the sum of said torque, speed and forced shiftdown signals is above a predetermined triggering level; and means applying said forced shiftdown signal to said circuit means in parallel with said torque and speed signals when a forced shiftdown occurs, said circuit means comprising a trigger circuit having two cascaded transistors, an input and an output applying a trigger signal to said actuating means, resistance means connected in series with said speed signal producing means and said input, a bypass transistor for bypassing therethrough said speed signal upon reception of a predetermined level of voltage, and a transistor receptive of a voltage signal appearing at said output for controlling the reception of said bypass transistor.

6. For use in an automotive vehicle, in combination, a throttle-controlled engine, an automatic transmission for coupling the engine to drive mechanism of a vehicle, and an electronic control system for shifting the transmission between two adjacent speed ranges, said control system comprising: first detection means producing a first voltage signal which is a function of throttle valve position; second detection means producing a second voltage signal which is a function of transmission output speed; third detection means producing a third voltage signal which is representative of a forced shiftdown operation of the transmission; electro-hydraulic means for selectively actuating speed change elements of the transmission when energized; circuit means receptive of said first, second and third voltage signals in parallel for energizing said electro-hydraulic means when the sum of said first, second and third voltage signals is above a predetermined triggering level; and means applying said third voltage signal to said circuit means in parallel with said first and second voltage signals when a forced shiftdown occurs, said circuit means comprising a trigger circuit having two cascaded transistors, an input and an output applying a trigger signal to said electro-hydraulic means, resistance means connected in series with said second detection means and said input, a bypass transistor for bypassing therethrough said second voltage signal upon reception of a predetermined level of voltage, and a transistor receptive of a voltage signal appearing at said output for controlling the reception of said bypass transistor.

* * * * *